C. A. DUNHAM.
STEAM TRAP.
APPLICATION FILED NOV. 24, 1917.
1,373,225.
Patented Mar. 29, 1921.
2 SHEETS—SHEET 2.
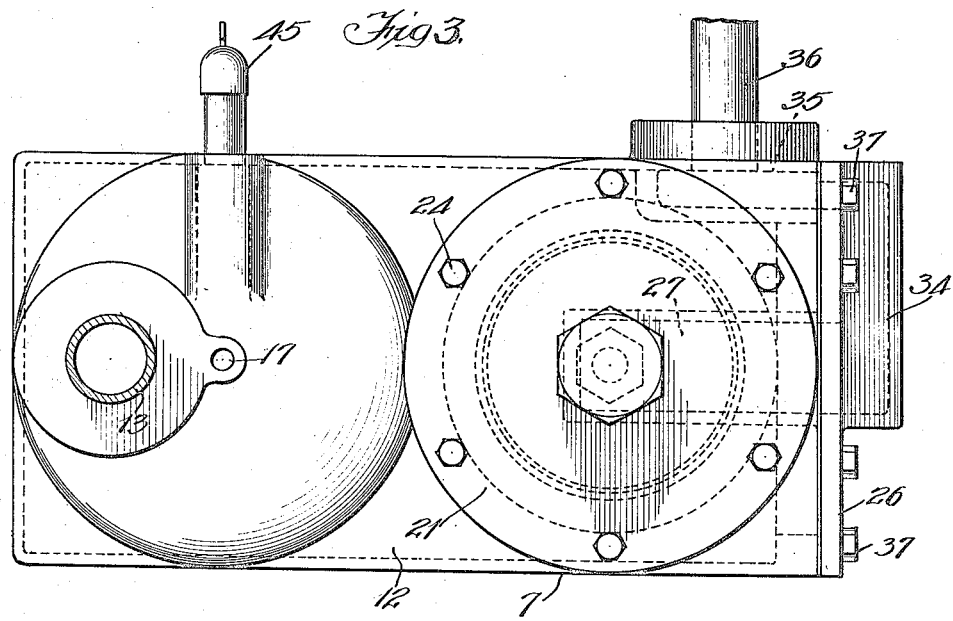
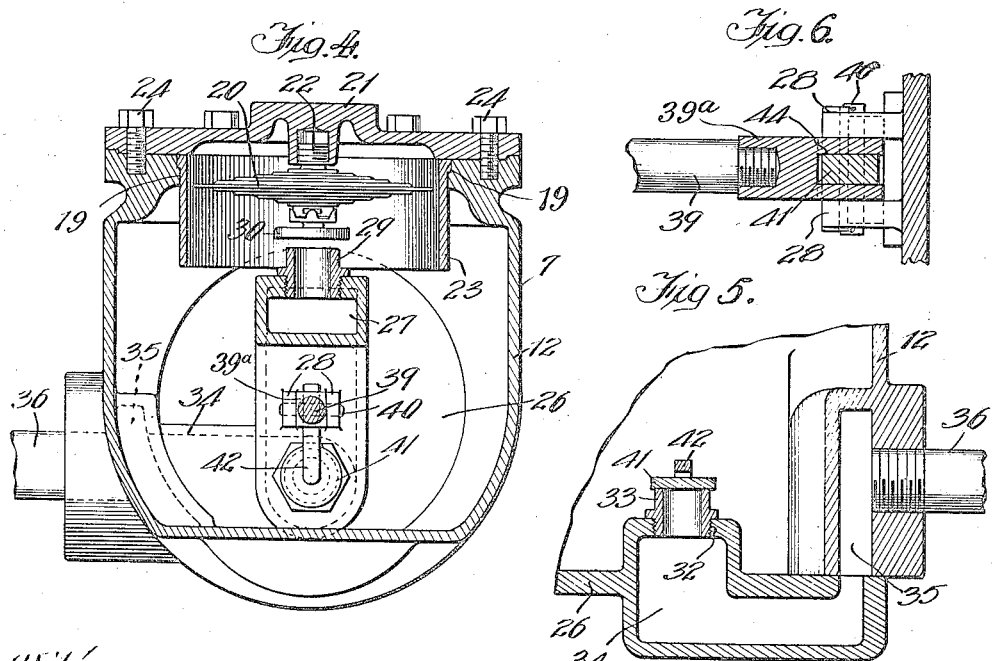
Witnesses:
W. P. Kilroy
Harry R. White
Inventor:
Clayton A. Dunham
by Barnett Turman
Attys.

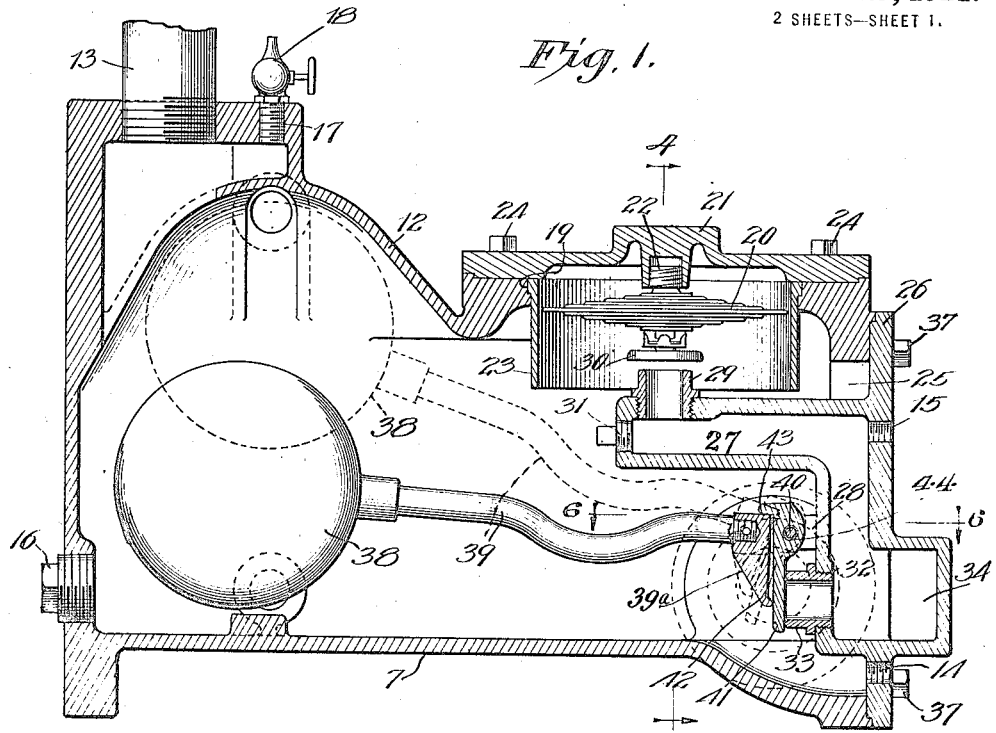
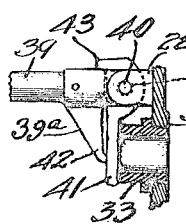
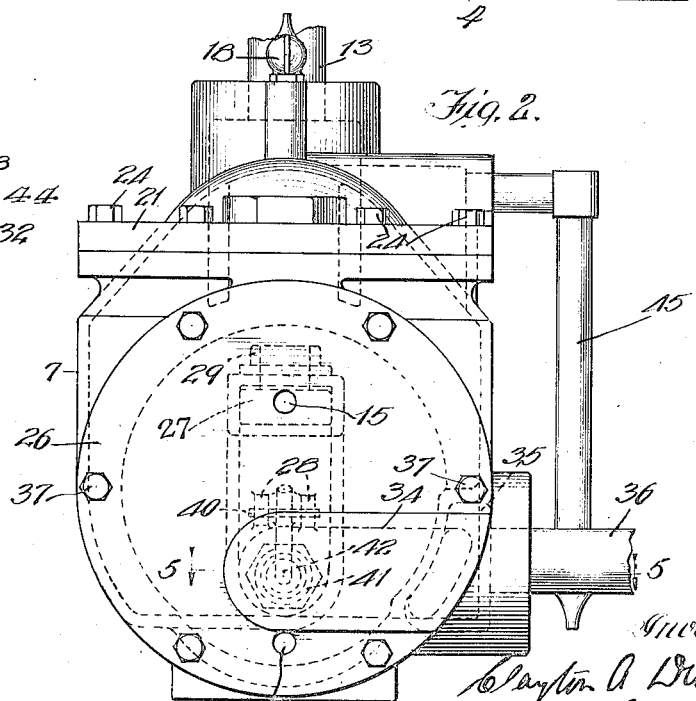

UNITED STATES PATENT OFFICE.

CLAYTON A. DUNHAM, OF GLENCOE, ILLINOIS.

STEAM-TRAP.

1,373,225.  Specification of Letters Patent.  Patented Mar. 29, 1921.

Application filed November 24, 1917. Serial No. 203,729.

*To all whom it may concern:*

Be it known that I, CLAYTON A. DUNHAM, a citizen of the United States, residing at Glencoe, in the county of Cook and State of Illinois, have invented certain new and useful Improvements in Steam-Traps, of which the following is a specification.

My invention relates to a steam trap, and has for its object to provide a steam trap of novel and improved construction which is particularly adapted for use in situations where a relatively large amount of steam is condensed, such for example, as in connection with a steam heating system of the indirect type which is usually employed in the heating of large buildings or apartments.

The invention consists further in the new constructions, arrangements and devices, to be hereinafter described and claimed, for carrying out the above stated object, and such other objects as will appear from the following description.

The invention is illustrated in a preferred embodiment in the accompanying drawings, wherein:

Figure 1 is a longitudinal section of my improved steam trap;

Fig. 2 is a front elevation of the steam trap;

Fig. 3 is a plan view of the same;

Fig. 4 is a section on line 4—4 of Fig. 1;

Fig. 5 is a section of a portion of the trap, taken on line 5—5 of Fig. 2;

Fig. 6 is a section of a detail taken on line 6—6 of Fig. 1; and

Fig. 7 is a view, partly in section, of the water valve.

Like characters of reference indicate like parts in the several figures of the drawings.

As shown in Figs. 1 to 4 inclusive, the trap is arranged with relation to the discharge pipe 13 of a heating system (not shown) so as to discharge the air and water through independently controlled discharge outlets; the air outlet being thermostatically controlled and the water outlet being controlled by the level of the water in the trap casing.

I have shown in these figures a preferred form of construction. The trap comprises a casing 12 having an inlet through the pipe 13 at the upper portion thereof. The casing is provided with suitable plugs 14, 15 and 16, so as to permit a proper cleaning thereof. I also provide a vent 17 controlled by the small valve 18 for the purpose of permitting the escape of air or steam if necessary. In the top of the casing 12 I have provided an opening 19 to receive the thermally controlled mechanism for actuating the air valve. The thermostat itself is shown at 20, and is of common construction. It is secured to a cover 21 by means of the threaded stud 22. Inside of the opening I place a cylindrical shell 23 which forms a thermostat chamber, and also serves to protect the thermostat and air valve. The cover 21 is bolted to the casing by means of stud bolts 24. At the forward end of the casing there is another opening 25, closed by the cover 26. Associated with the cover 26 and preferably formed integrally therewith, is the air duct 27 and the necessary lugs for securing the water valve and float in position, as shown at 28. The air duct is tapped to receive a valve seat 29 upon which the valve 30 attached to the thermostat 20 seats. The air duct is provided with a cleaning opening closed by a plug 31. The side of the wall which forms the air duct is tapped at 32 to receive the valve seat 33 for the water valve. The air discharge and water discharge outlets lead to a common duct 34, preferably integrally cast in the cover 26. This common duct leads to one side of the casing into the chamber 35 formed in the side of the casing, into which is tapped the discharge pipe 36. I prefer to tap the discharge pipe 36 into the side of the casing, rather than the cover 26, so that if necessary the cover 26 may be removed by merely removing the stud bolts 37 without removing any sections of pipe. By this means I gain in a simple manner a ready access to the interior of the casing.

The valve controlling the discharge of the water from the casing is controlled by float 38, pivoted by means of an arm 39, clevis 39ª and the pivot pin 40 to the lugs 28 on the wall of the cover 26. The valve 41 is formed separately from the float arm, and is pivoted independently of the float arm on the pivot pin 40. The valve is actuated by means of the fingers 42 and 43, forming part of the float arm, clevis 39ª. In order that the valve may seat accurately upon the valve seat, I form the opening 44 of the valve by means of which it is pivoted to the pin 40 somewhat larger than the pin, so that it may be free to adjust itself on the valve seat. The slight irregularities in the valve seat caused by scale and rust make such a construction desirable, the valve being thus loosely pivoted to the pin 40 and permitted to adjust itself on the valve seat independently of the float or float arm.

I have shown the casing provided with a gage glass 45, in order that the height of the water in the casing may be determined so as to ascertain whether the trap is properly discharging the water therefrom.

By this arrangement of independently controlled air and water outlets, it will be seen that the water of condensation may be discharged from the casing regardless of the temperature therein, so that even though steam is present in the casing (in which case the thermostatically controlled air valve would be closed), the water of condensation, if the level be sufficiently high, is discharged through its valve into the common discharge duct 34. The advantages of this construction will be appreciated when it is considered that if the discharge outlet were controlled by a thermostat, no water of condensation could be discharged, no matter how great the quantity thereof in the chamber, if any steam reached the thermostat, thereby causing it to close. While such a steam trap might be suitable in situations in which the quantity of condensed water were relatively small, it is unsuitable in cases in which there is a relatively large amount of water of condensation. In such cases, it is highly desirable to use a steam trap in which the water of condensation may be discharged independently of the temperature in the trap casing. Furthermore, the thermostat is at all times out of contact with the water, so that its operation is more sensitive and accurate.

It will be seen that modifications in my device might be made without departing from the spirit of the invention as expressed in the foregoing specification. Accordingly, I do not desire to limit my invention except as such limitations occur in the following claims.

I claim:

1. In a steam trap of the character described, a valve seat, a valve loosely hinged to open and close with a radial movement and having capacity for bodily movement toward or away from said seat independently of said radial movement to automatically adjust itself with relation to said seat, and a float valve having an arm engaging said valve for opening the same.

2. In a steam trap of the character described, a valve seat, a float hinged adjacent to said seat, and a valve controlled by said float hinged to open and close with a radial movement and having capacity for movement toward or away from said seat independently of said radial movement and independently of said float.

3. In a steam trap of the character described, a valve seat, a valve adapted to open and close with a radial movement, means comprising a pivot member for loosely hinging said valve whereby the valve may move bodily toward or away from said seat independently of said radial movement and a float having an arm for operating said valve.

4. In a steam trap of the character described, a valve seat, a valve, a pivot pin for hinging said valve, said valve having a transverse opening therethrough substantially larger than said pivot pin and through which said pivot pin passes whereby said valve has capacity for automatic adjustment with relation to said seat, and a float having an arm hinged to said pin and having means loosely engaging said valve for operating it.

5. In a steam trap having independently controlled air and condensate outlets, a casing having in the top thereof an opening, a cover for said opening to which is secured the mechanism for controlling said air outlet, said casing also having an opening in the side thereof, a cover for said side opening to which is secured the mechanism for controlling said condensate outlet, said last named cover also having the air duct secured to it and so formed as to be located when in position directly beneath said first-named mechanism.

6. In a steam trap of the character described, a valve seat, a loosely hinged flap valve adapted to open and close with a radial movement and having capacity for automatic adjustment with relation to said seat independently of said radial movement and means for opening and closing said valve.

CLAYTON A. DUNHAM.